(12) United States Patent
Wright et al.

(10) Patent No.: US 7,607,283 B2
(45) Date of Patent: Oct. 27, 2009

(54) LAWN MOWER WITH DECK LIFT SYSTEM AND/OR PUMP LOCK-OUT SYSTEM

(75) Inventors: Edward R. Wright, Dickerson, MD (US); William R. Wright, Clarksburg, MD (US); Luke Waesche, Hagerstown, MD (US); James D. Velke, Germantown, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 0 days.

(21) Appl. No.: 11/984,924

(22) Filed: Nov. 26, 2007

(65) Prior Publication Data

US 2008/0072559 A1      Mar. 27, 2008

Related U.S. Application Data

(62) Division of application No. 11/208,003, filed on Aug. 22, 2005, now Pat. No. 7,318,311.

(51) Int. Cl.
     *A01D 34/00* (2006.01)
(52) U.S. Cl. .................................................. 56/17.1
(58) Field of Classification Search ............... 56/17.1, 56/15.8, 15.2, 14.9
     See application file for complete search history.

(56) References Cited

U.S. PATENT DOCUMENTS

| | | | | |
|---|---|---|---|---|
| 3,702,051 A * | 11/1972 | Deines | ......................... | 56/11.3 |
| 4,325,211 A * | 4/1982 | Witt et al. | ..................... | 56/15.8 |
| 4,829,754 A * | 5/1989 | Shimamura et al. | .......... | 56/15.9 |
| 4,896,493 A * | 1/1990 | Neuerburg | ................... | 56/255 |
| 4,920,733 A | 5/1990 | Berrios | | |
| 5,079,926 A * | 1/1992 | Nicol | ......................... | 56/12.7 |
| 5,251,429 A | 10/1993 | Minato et al. | | |
| 5,528,886 A * | 6/1996 | Esau | .......................... | 56/14.9 |
| 5,758,478 A * | 6/1998 | Bando et al. | .................. | 56/15.2 |
| 5,771,669 A * | 6/1998 | Langworthy et al. | ............. | 56/6 |
| 5,816,033 A | 10/1998 | Busboom et al. | | |
| 5,816,035 A * | 10/1998 | Schick | ....................... | 56/15.2 |
| 5,822,961 A | 10/1998 | Busboom | | |
| 5,927,055 A * | 7/1999 | Ferree et al. | .................. | 56/15.9 |
| 5,964,082 A | 10/1999 | Wright et al. | | |
| 6,138,446 A | 10/2000 | Velke et al. | | |
| 6,189,304 B1 | 2/2001 | Velke et al. | | |
| 6,276,486 B1 | 8/2001 | Velke et al. | | |
| 6,341,479 B1 | 1/2002 | Scag et al. | | |
| 6,341,480 B1 * | 1/2002 | Dahl et al. | .................... | 56/15.9 |
| 6,347,502 B1 | 2/2002 | deVries | | |
| 6,390,225 B2 | 5/2002 | Velke et al. | | |
| 6,438,930 B1 | 8/2002 | Velke et al. | | |
| 6,438,931 B1 | 8/2002 | Velke et al. | | |
| 6,490,849 B1 | 12/2002 | Scag et al. | | |
| 6,494,028 B2 | 12/2002 | Moore | | |
| 6,560,952 B2 | 5/2003 | Velke et al. | | |
| 6,658,831 B2 | 12/2003 | Velke et al. | | |
| 6,688,089 B2 | 2/2004 | Velke et al. | | |
| 6,701,825 B1 | 3/2004 | Langenfeld | | |
| 6,782,797 B1 | 8/2004 | Brandenburg et al. | | |
| 6,868,658 B2 * | 3/2005 | Velke et al. | .................. | 56/15.8 |

(Continued)

*Primary Examiner*—Árpád Fábián-Kovács
(74) *Attorney, Agent, or Firm*—Nixon & Vanderhye P.C.

(57) ABSTRACT

A lawn mower that includes, a deck lift system, is disclosed. The deck lift system may lift/lower the cutter deck, engine deck, engine, and handle control assembly together at the same time.

3 Claims, 14 Drawing Sheets

U.S. PATENT DOCUMENTS

| | | |
|---|---|---|
| 6,912,831 B2 | 7/2005 | Velke et al. |
| 7,028,456 B2 * | 4/2006 | Thatcher et al. ............... 56/15.6 |
| 7,293,398 B2 * | 11/2007 | Koehn ........................ 56/15.9 |
| 7,318,311 B2 | 1/2008 | Wright et al. |
| 2001/0001170 A1 | 5/2001 | Velke et al. |
| 2002/0059788 A1 | 5/2002 | Velke et al. |
| 2002/0178709 A1 | 12/2002 | Velke et al. |
| 2005/0126146 A1 | 6/2005 | Velke et al. |

* cited by examiner

LAWN MOWER WITH DECK LIFT SYSTEM AND/OR PUMP LOCK-OUT SYSTEM

This application is a divisional of application Ser. No. 11/208,003, filed Aug. 22, 2005, now U.S. Pat. No. 7,318,311 the entire content of which is hereby incorporated herein by reference in this application.

This invention relates to a lawn mower. In certain example embodiments, the lawn mower includes an improved deck lift system and/or an improved brake pump lock-out system.

BACKGROUND OF THE INVENTION

Lawn mowers are known in the art. For example, stand-on mowers are discussed in U.S. Pat. Nos. 6,138,446, 6,390,225, 6,688,089, 6,438,931, 6,189,304, 6,438,930, 6,658,831, 6,560,952, and 5,964,082, the disclosures of all of which are all hereby incorporated herein by reference. Example walk-behind lawn mowers are discussed in U.S. Patent Documents 2005/0126146 and 4,920,733, the disclosures of which are all hereby incorporated herein by reference. Example mower operable by seated occupants are discussed in U.S. Patent Documents 2001/0001170, 2002/0059788, U.S. Pat. Nos. 6,438,930, 6,438,931, 6,688,089, 6,658,831, and 6,560,952, the disclosures of which are all hereby incorporated herein by reference.

FIGS. 1-4 illustrate an example lawn mower operable by a seated and/or standing occupant, from U.S. Pat. No. 6,688,089, the disclosure of which is incorporated herein by reference. The mower of FIGS. 1-3 is a zero radius turning self-propelled power lawn mower. This mower includes first and second hydro pumps for controlling first and second corresponding wheel motors, so that the first and second rear drive wheels 43 may be driven independently in order to conduct zero radius turns as discussed above. The mower further includes: independently drivable rear drive wheels 43; cutter deck assembly 12 below which the cutting blades cut grass; front caster wheels 37; foot platform 9 for supporting feet of a standing or sitting operator; optional seat 1; gas tank supports 80 for supporting respective gas tanks; battery housing structure 81 for housing a battery 30 and which also functions to help support the seat assembly; steering control levers 33-34 (which work in conjunction with rigid hand grip bar 32) which allow the rear drive wheels 43 to be independently drivable in opposite directions at the same time so as to enable the mower to perform zero radius turns about a vertical zero radius turning axis; vertically extending support plates or weldments 14 which support console 36 and handle grips 32-34; and deck lift lever 82 which allows the cutter deck assembly 12 together with the engine deck 31 (the combustion engine is mounted on the engine deck 31) to be raised and lowered together in order to adjust the height of the mower cut. For example, when deck lift lever 82 is pulled upwardly, the cutter deck assembly 12 together with the engine deck 31 (and engine) is raised so as increase the height of the mower cut. Chain linkage 83 suspends the deck assembly 12 and 31 and permits it to be raised and lowered in accordance with the position of lever 82.

When deck lift lever 82 is pulled upwardly in a clockwise pivoting fashion ("clockwise" as defined from the port side of the mower as in FIGS. 2 and 4) by an operator, this causes a rod (not shown) traversing the mower frame to also rotate in a clockwise direction. This rod, attached to deck lift rods 100 on either side of the mower, causes rods 100 to be pulled toward the rear of the mower so that lift brackets pivot counterclockwise about pivot axes 101 in order to lift the cutter deck assembly 12 together with the engine deck 31 and engine upwardly via chains 83 in order to raise the cut of the mower. Since the handle grips 32-34 and weldments 14 are attached to the frame and not the engine or cutter deck(s), the grips 32-34 and weldments 14 do not move up/down along with the cutter deck assembly 12, engine, and engine deck 31. In a similar manner, when lever 82 is lowered from a locked position, the weight of the deck assemblies and engine causes the illustrated brackets to rotate clockwise ("clockwise" as defined in, for example, FIG. 2) about axes 101 and rods 100 to move in a forward direction so that the cutter deck assembly 12 is lowered along with the engine deck 31 and engine. In this respect, control arms 130 (see FIG. 4) maintain the lateral position of the cutter deck assembly 12 and engine deck 31 (and the engine) during lower/raising by the deck lift system. Control arms pivot about pivot axis 91 during raising and lower of the decks, and tabs 131 are provided for supporting the pivot axis area.

As review of U.S. Pat. No. 6,688,089 will show that the tractor frame (and thus the handle controls and vertical weldments supported thereby) does not move up/down along with the decks. FIG. 4 illustrates that the tractor frame includes cross member or front wall 123 that is shaped so as to include approximately parallel portions 123a and 123b that are connected by angled portion 123c. The presence of angled portion 123c enables portions 123a and 123b to be approximately parallel to one another yet offset from one another thereby creating space 123d above angled portion 123c where the rear edge of engine deck 31 can move up and down relative to the tractor frame during cutting height adjustment initiated by the deck lift system. In other words, the presence of angled portion 123c creates space 123d so that the space above the toes of the operator (the toes would be at area 123e) may be used for enabling the engine deck to move up/down relative to the frame.

Further details of the mower of FIGS. 1-4 may be found in U.S. Pat. No. 6,688,089, incorporated herein by reference. While the mower of FIGS. 1-4 is excellent in many respects, systems therein may be subject to improvement in certain instances.

BRIEF SUMMARY OF EXAMPLE EMBODIMENTS OF THE INVENTION

This invention relates to a lawn mower. In certain example embodiments, the lawn mower includes an improved deck lift system and/or an improved brake pump lock-out system.

In certain example embodiments of this invention, there is provided a lawn mower comprising: at least one cutting blade for cutting grass; first and second drive wheels; a cutter deck assembly and an engine deck, the engine deck supporting an engine that drives the at least one blade for cutting grass; a handle control assembly for allowing an operator to steer the mower by controlling the speed and direction of the first and second drive wheels; and a deck lift system for raising together each of the cutter deck assembly, engine deck, engine, and handle control assembly relative to a frame of the mower in changing a cutting height of the mower.

In other example embodiments of this invention, there is provided a lawn mower comprising: at least one cutting blade for cutting grass; first and second drive wheels; a cutter deck assembly and an engine deck, the engine deck supporting an engine that drives the at least one blade for cutting grass; a handle control assembly for allowing an operator to steer the mower by controlling the speed and direction of the first and second drive wheels; a deck lift system for raising together each of the cutter deck assembly, engine deck, and engine relative to a frame of the mower in changing a cutting height of the mower; wherein the deck lift system comprises a rear weldment that pivots relative to the frame about a first horizontal axis, the rear weldment including a port side rear deck lift bracket, a starboard side rear deck lift bracket, and a first bar provided between and connecting at least the port side and starboard side rear deck lift brackets so that at least the port side rear deck lift bracket, starboard side rear deck lift bracket and the bar move together in unison during operation of the deck lift system, and a front weldment that pivots relative to the frame about a second horizontal axis, the front weldment including at least a port side front deck lift bracket, a starboard side front deck lift bracket, and a second bar provided between and connecting the port side and starboard side front deck lift brackets so that the port side front deck lift bracket, starboard side front deck lift bracket and the second bar move together in unison during operation of the deck lift system; and wherein the deck lift system further comprises an elongated non-threaded link interconnecting one of the rear deck lift brackets to one of the front deck lift brackets. The term "weldment" as used herein means that the components are welded or otherwise connected (e.g., welded, bolted, screwed, and/or glued), directly or indirectly, so as to form a unitary fairly rigid structure (i.e., components of a "weldment" do not pivot with respect to each other).

In other example embodiments of this invention, there is provided a lawn mower comprising: at least one cutting blade for cutting grass; first and second drive wheels; a cutter deck assembly and an engine deck, the engine deck supporting an engine that drives the at least one blade for cutting grass; a handle control assembly for allowing an operator to steer the mower by controlling the speed and direction of the first and second drive wheels; a deck lift system for raising together each of the cutter deck assembly, engine deck, and engine relative to a frame of the mower in changing a cutting height of the mower; and an extension spring that resists extension, the extension spring having an axis that defines an angle of from about 0 to 45 degrees with the vertical, and wherein the extension spring provides force to help lift the cutter deck assembly and/or engine deck when the deck lift system is used to raise the cutter deck assembly and/or engine deck.

In still further example embodiments of this invention, there is provided a lawn mower comprising: at least one drive wheel whose drive direction and speed are controlled by a pump, where the drive wheel can be drive in both forward and reverse directions; a hand-actuated lever which actuates both a pump lock-out system and causes a braking force to be applied to at least one wheel of the mower, wherein actuation of the lever causes both: (a) braking force to be applied to the mower, and (b) the pump lock-out system to be engaged so as to prevent the pump from being changed from a neutral state; wherein the pump lock-out system includes a group of first components that move up and down with an engine deck when the engine deck is moved up and down via a deck lift system and a group of second components that do not move up and down with the engine deck when the engine deck is moved up and down via the deck lift system, and a link that is pivotally engaged with at least one of the first group of components and one of the second group of components.

In still further example embodiments of this invention, there is provided a lawn mower comprising: at least one cutting blade for cutting grass; first and second drive wheels; a deck lift system for raising a cutter deck assembly and/or engine deck; the deck lift system including a lift handle assembly for actuating the deck lift system, the lift handle assembly comprising a button at a top of a handle, the button to be actuated by a finger of an operator, a spring for biasing a lock toward engagement with a cog, and wherein pressing down on the button causes the lock to disengage with the cog against biasing force of the spring.

DETAILED DESCRIPTION OF EXAMPLE EMBODIMENTS OF THE INVENTION

Figure 1:
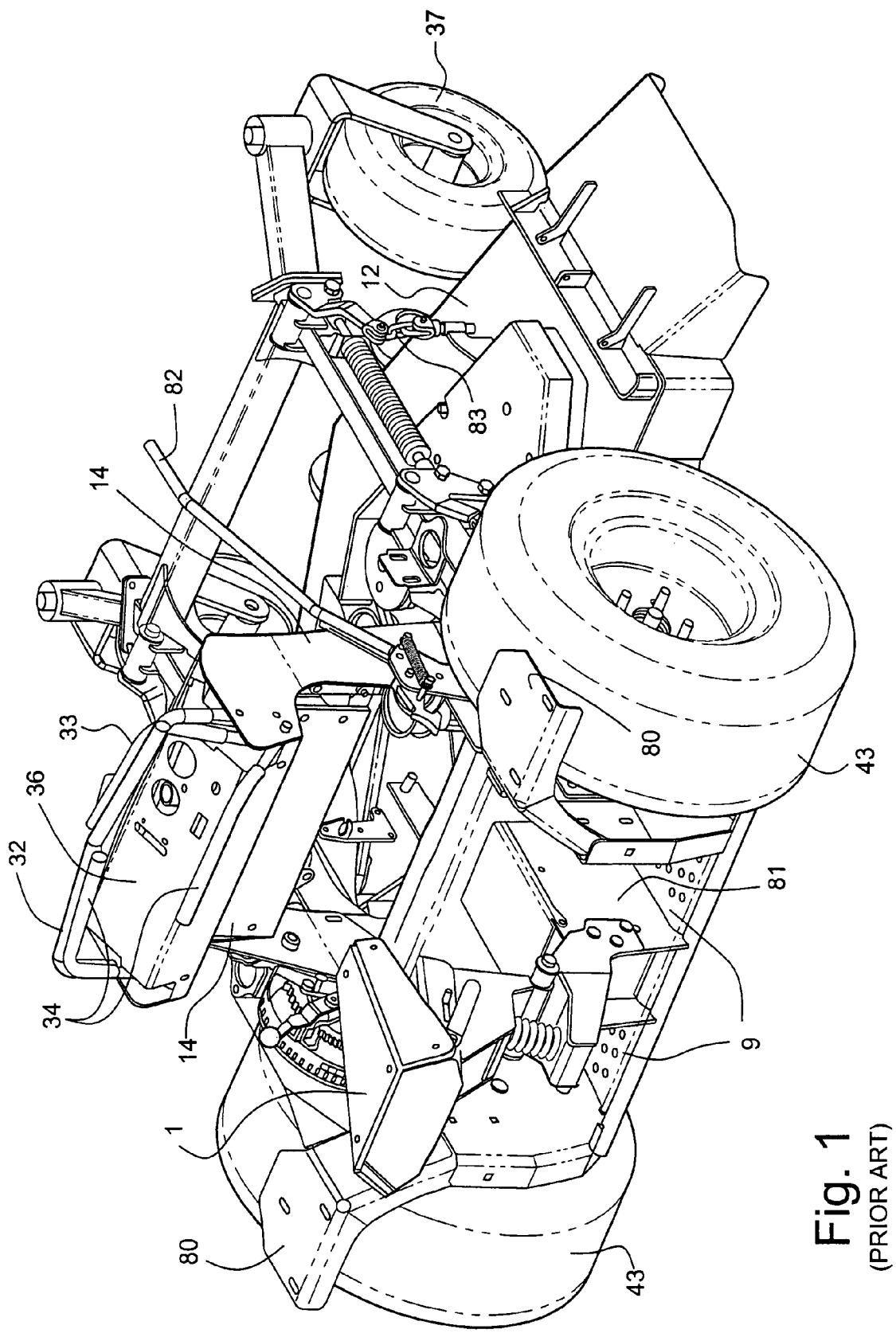
FIG. 1 is a perspective view of a conventional lawn mower including a deck lift system.
Figure 2:
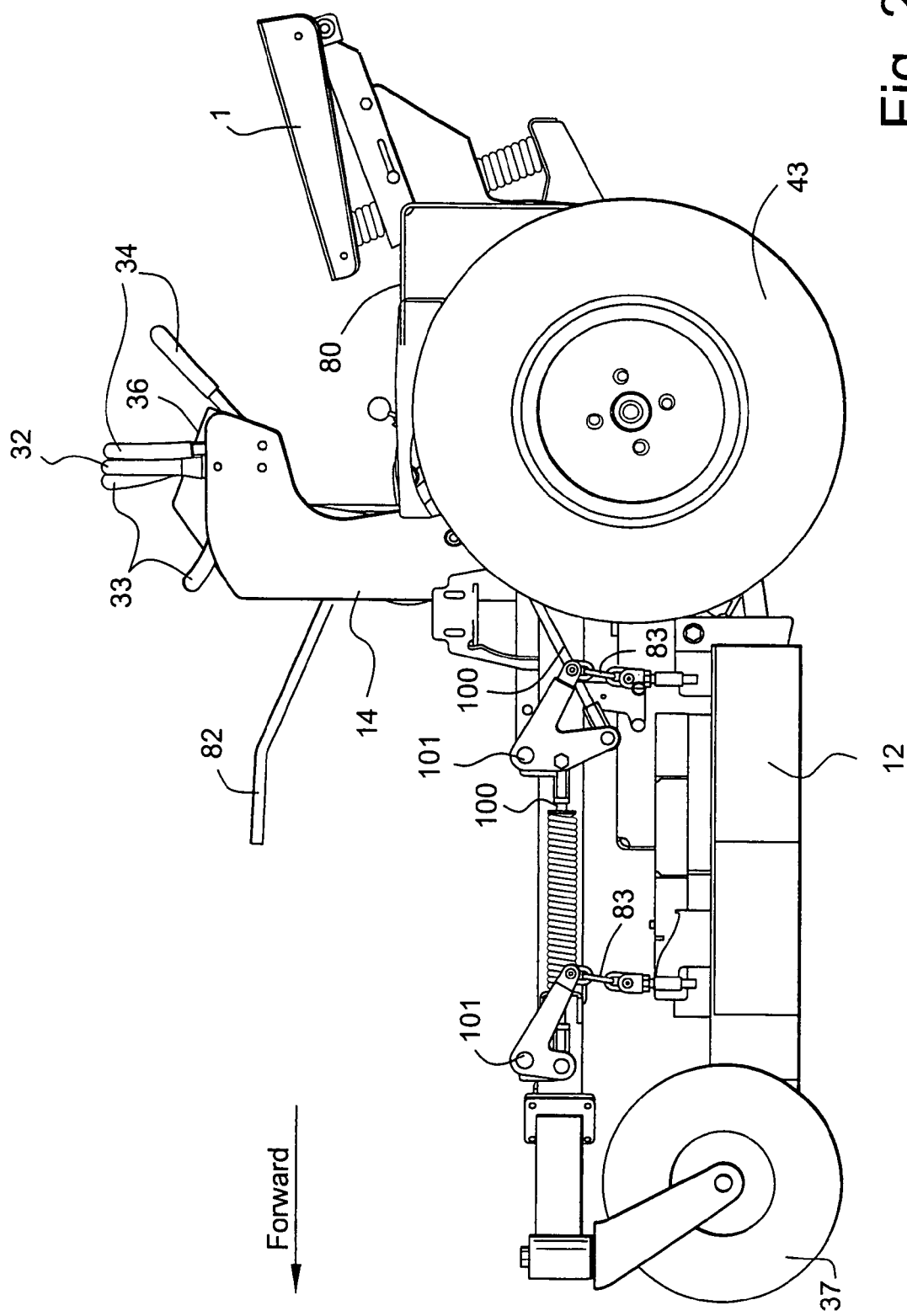
FIG. 2 is a side plan view of the mower of FIG. 1.
Figure 3:
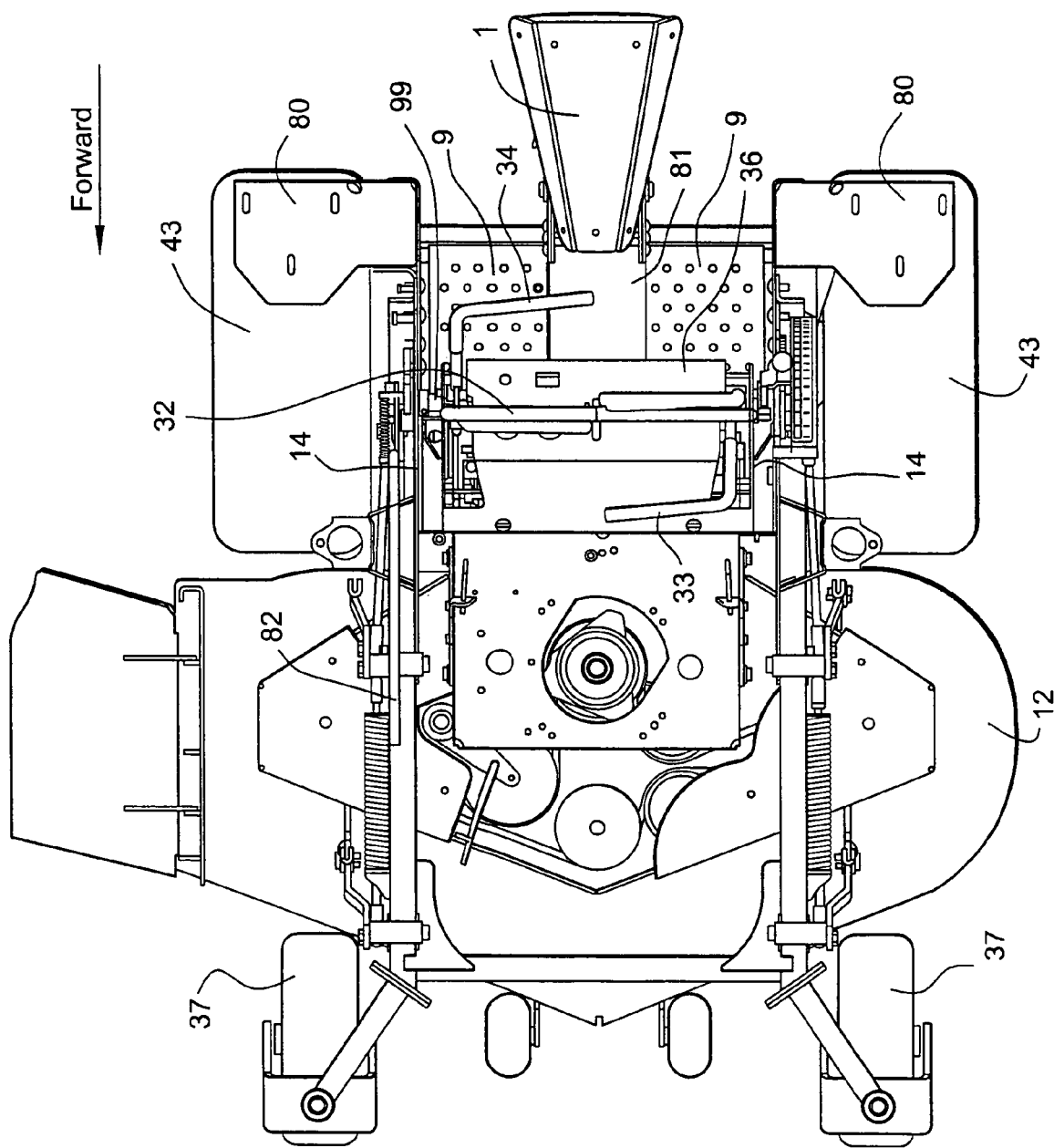
FIG. 3 is a top view of the mower of FIGS. 1-2.
Figure 4:
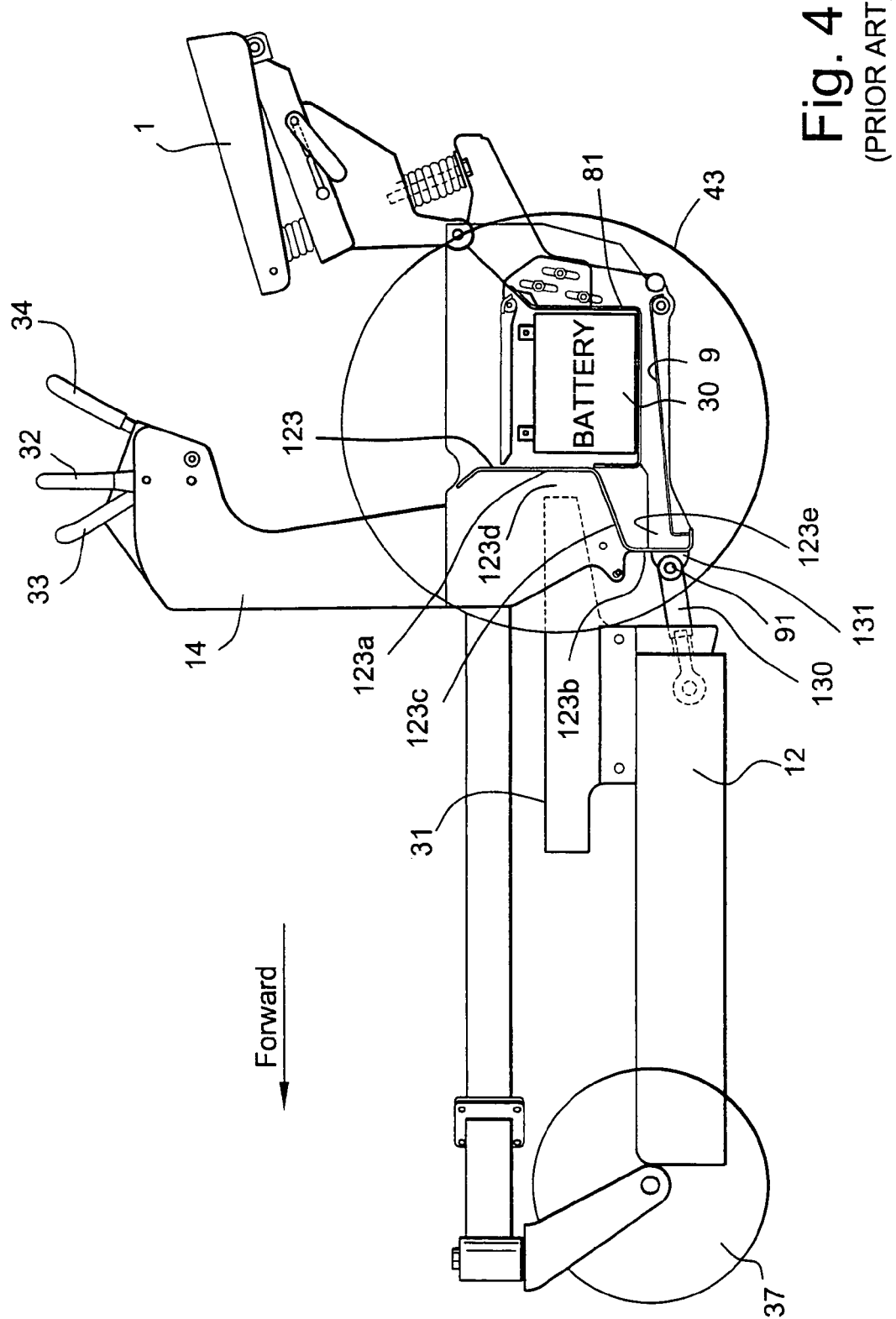
FIG. 4 is a schematic diagram illustrating certain components of the mower of FIGS. 1-3.

Referring now more particularly to the accompanying drawings in which like reference numerals indicate like parts throughout the several views. The mowers of certain example embodiments of this invention discussed herein may be the same as the mower discussed above with respect to FIGS. 1-4 except for the changes illustrated in the figures herein and/or described herein.

Figure 5:
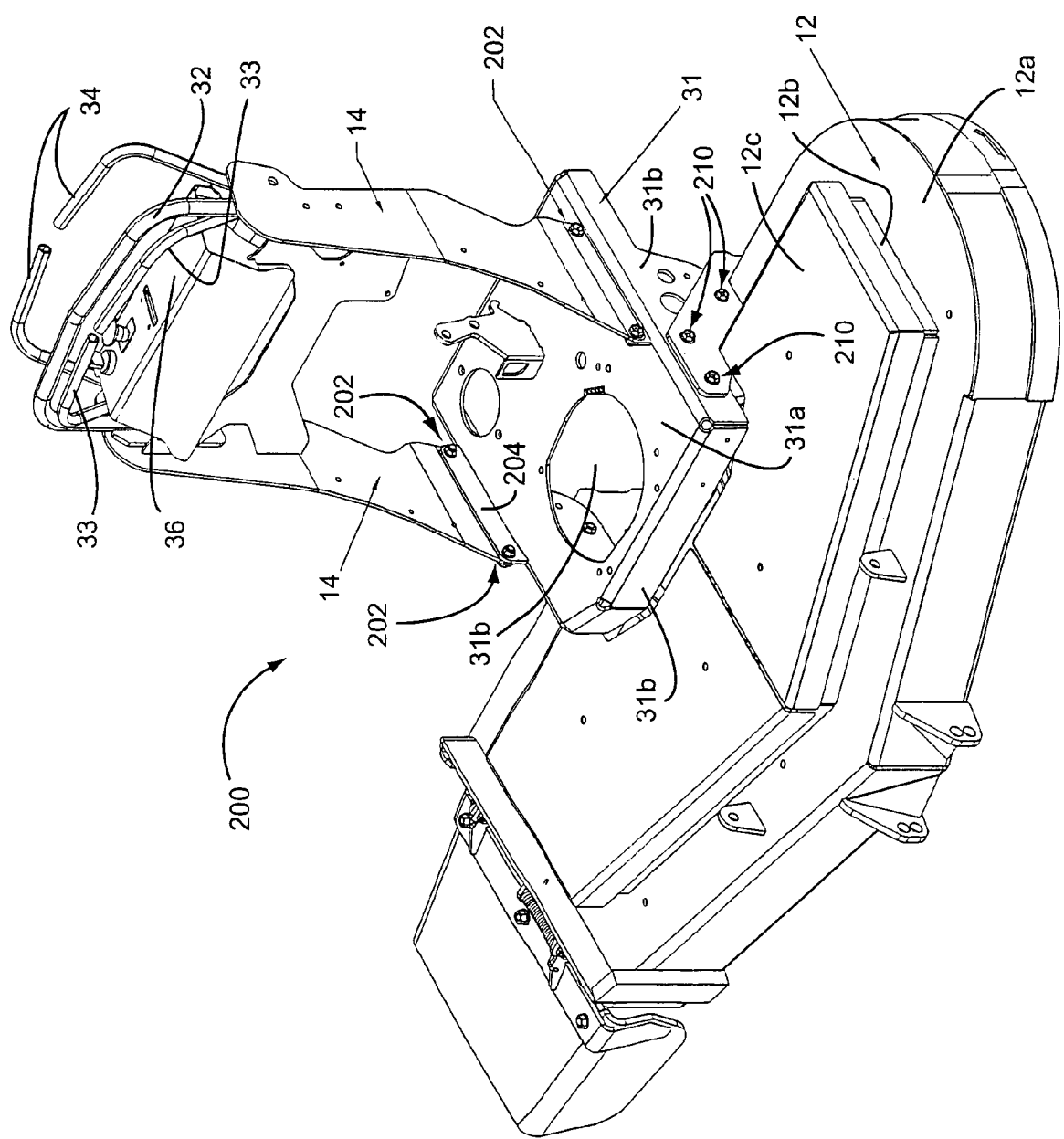
FIG. 5 is a perspective view of an integrated structure including an engine deck, cutter deck assembly, upright supports, dash and handle control assembly of a mower according to an example embodiment of this invention; this integrated structure moves up/down together when the deck lift system is used.

FIG. 5 is a perspective view illustrating an integrated structure 200 of a mower according to an example embodiment of this invention. The entire integrated structure 200 moves up/down together when the deck lift system lifts or lowers the decks in order to adjust the cutting height of the mower. The word "integrated" means that the parts of the integrated structure 200 are all connected, directly or indirectly, so as to move up/down together when adjusted by the deck lift system. As shown in FIG. 5, the integrated structure includes engine deck 31 (on which the engine, and hydro or hydraulic pumps are mounted—not shown in this figure for purposes of simplicity), cutter deck assembly 12 below which cutting blade(s) of the mower are provided, and vertically extending support plates or weldments 14 which support the mower dash 36 and handle control assembly. Example hydraulic pumps are described in U.S. Pat. No. 6,782,797, the disclose of which is hereby incorporated herein by reference. The cutter deck assembly 12 includes a cutter deck 12a below which the blades are mounted, a pulley system housing 12b that is covered by lid 12c to house pulleys and belts for driving the cutting blades. The mower's combustion engine (mounted on engine deck 31, and having a shaft extending through and/or below aperture 31b defined in the engine deck 31) drives the belts under lid 12c thereby driving the cutting blade(s) of the mower so that grass can be cut. The engine deck 31 in the FIG. 5 embodiment includes engine mounting surface or upper surface 31a, tabs 204, and sidewalls 31b. The engine deck 31 and cutter deck assembly 12 are rigidly mounted to one another via a plurality of bolts 210 in certain example embodiments of this invention, although they may be welded together in other example instances (bolts 210 are provided on both sides of the engine deck, although such bolts are only shown on one side of the engine deck in FIG. 5 for purposes of simplicity).

The handle control assembly includes, for example and without limitation, rigid bar provided between movable control levers 33 and 34. Control levers 33 and 34 when pivoted control corresponding hydraulic (hydro) pumps, which in turn control corresponding wheel motors, which in turn control corresponding rear drive wheels 43 of the mower. Thus, the hand control levers 33 and 34 control the speed and rotational direction of the rear drive wheels 43, and thus can be used to operate and steer the mower during operation.

Still referring to FIG. 5, the vertically extending support plates or weldments 14, which support the mower dash 36 and handle control assembly, are rigidly mounted to the engine deck 31, directly or indirectly, via bolts 202. Alternatively, the vertically extending support plates 14 could be welded to the engine deck instead of bolted to it. In the FIG. 5 embodiment, tabs 204 extend upwardly from a surface of the engine deck 31 and the vertically extending support plates or weldments 14 are bolted to the tabs 204. Thus, tabs 204 are provided for permitting the plates or weldments 14 to be mounted to the engine deck in the FIG. 5 embodiment. Tabs 204 may be welded, bolted or otherwise attached to the upper or side surface of the engine deck in different embodiments of this invention. Moreover, in other example embodiments, tabs 204 may be omitted and the plates or weldments 14 may be directly welded or bolted to an upper surface of the engine deck 31. Since the plates or weldments 14 support the handle control assembly 32-34 and dash 36 of the mower, the hand control assembly 32-34 and dash 36 are also rigidly mounted to the engine deck. Thus, whenever the deck lift system raises or lowers the engine deck 31, engine, and cutter deck assembly 12 together, the vertically extending plates or weldments 14, dash 36 and handle control assembly 32-34 move up/down therewith. Stated another way, the entire integrated structure 200 shown in FIG. 5 (and also the engine, hydro pumps, and other non-illustrated components) moves up and/or down together when the decks are moved by the deck lift system in order to raise/lower the cutting height of the mower.

Thus, the engine deck, engine, cutter deck assembly, hydro pumps, weldments 14, dash 36 and handle control/steering assembly 32-34 all move up/down together in unison so that an overall control system is simplified and more compact. This provides for a cheaper and more simplified control system (an example control system may include the hydro pumps and corresponding levers, the handle control assembly 32-34, upright supports 14, and control rod(s) between the pumps and handle control assembly). In certain example embodiments, the control system may be made simpler because it is possible to eliminate cable(s) and/or floating-link(s) since the handle control assembly moves up/down together with the pumps and engine deck.

It is noted, however, that the mower's frame (not shown in FIG. 5) does not move up/down together with the integrated structure 200 when the deck lift system is in use. Thus, when the deck lift system is actuated, it causes the engine deck 31, cutter deck assembly 12, upright supports 14, dash 36, and handle control assembly 32-34 to move up and down together relative to the frame of the mower.

Figure 6:
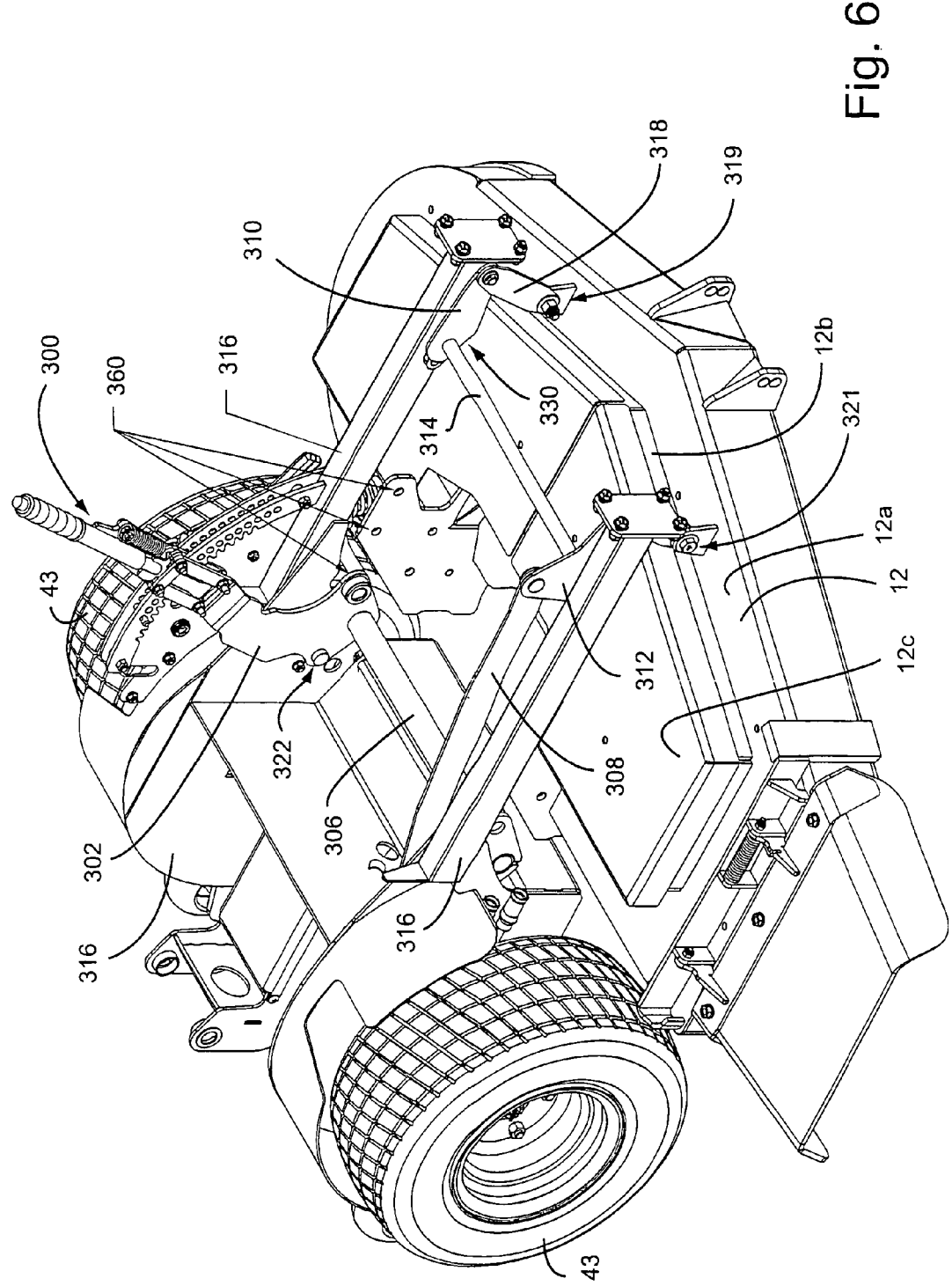
FIG. 6 is a perspective view of certain parts of a deck lift system of the mower of FIG. 5, according to an example embodiment of this invention.
Figure 7:
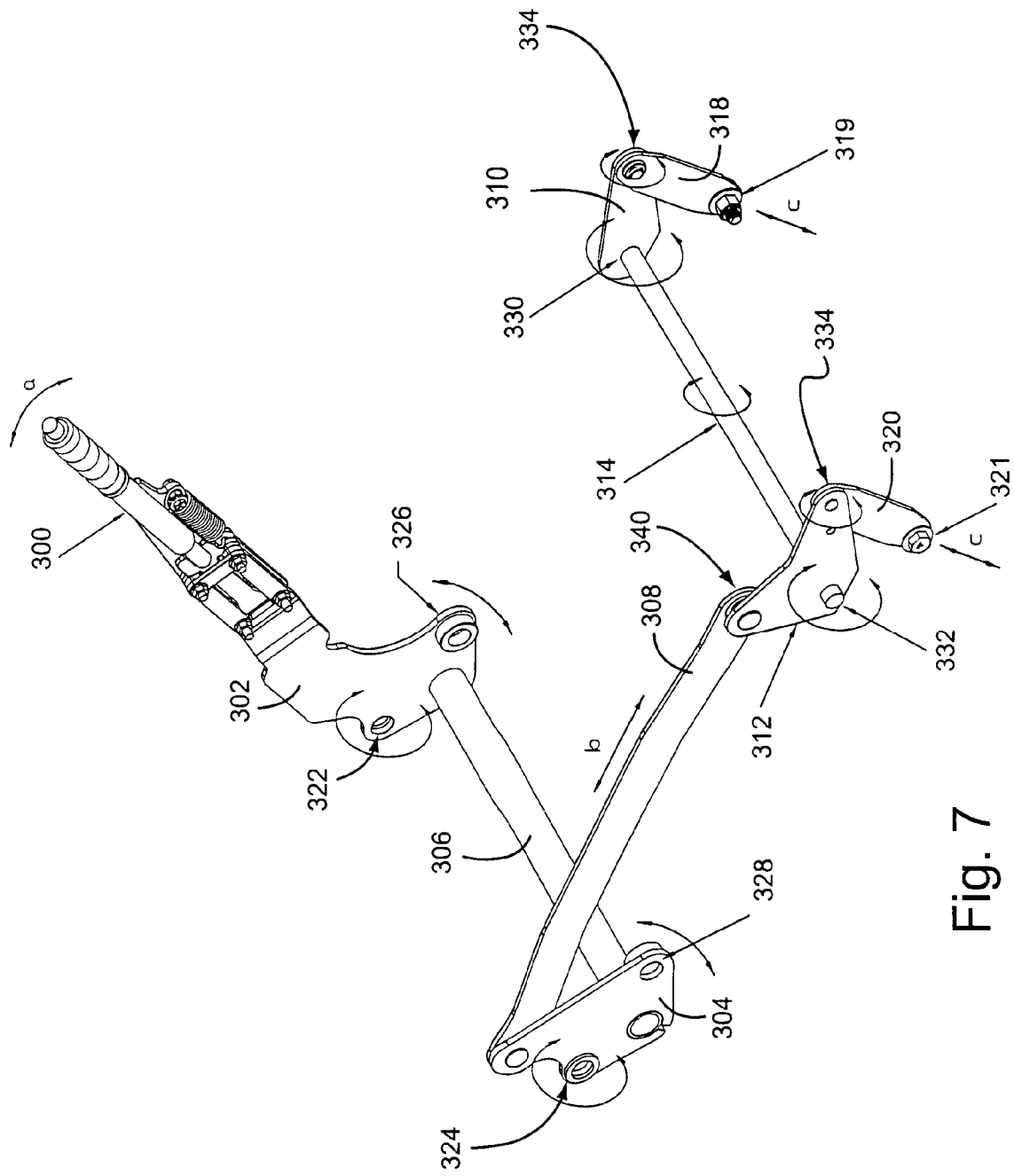
FIG. 7 is a perspective view of certain parts of the deck lift system of the mower of FIGS. 5-6, according to an example embodiment of this invention.
Figure 8:
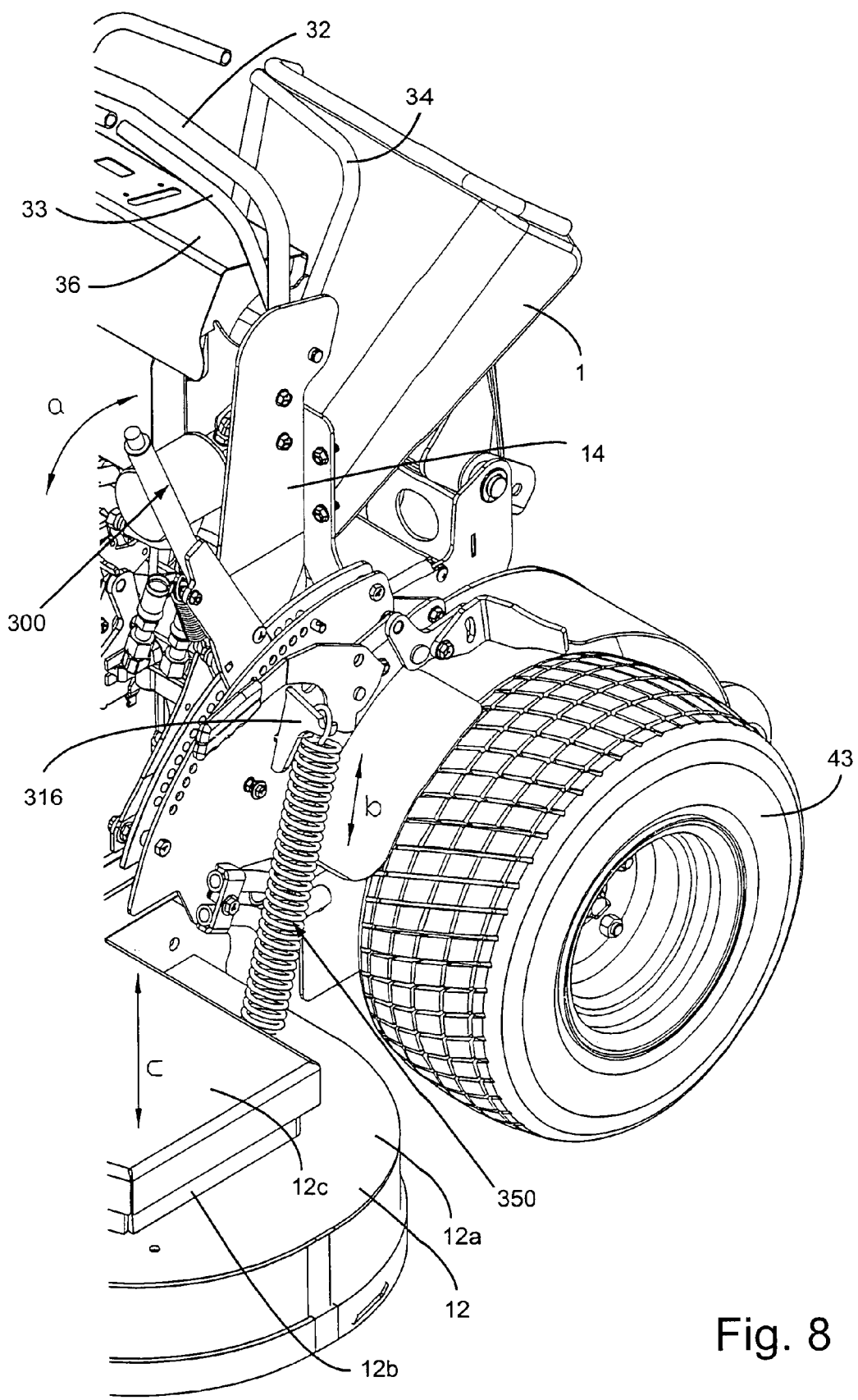
FIG. 8 is a perspective view of part of the mower of FIGS. 5-7 according to an example embodiment of this invention.
Figure 9:
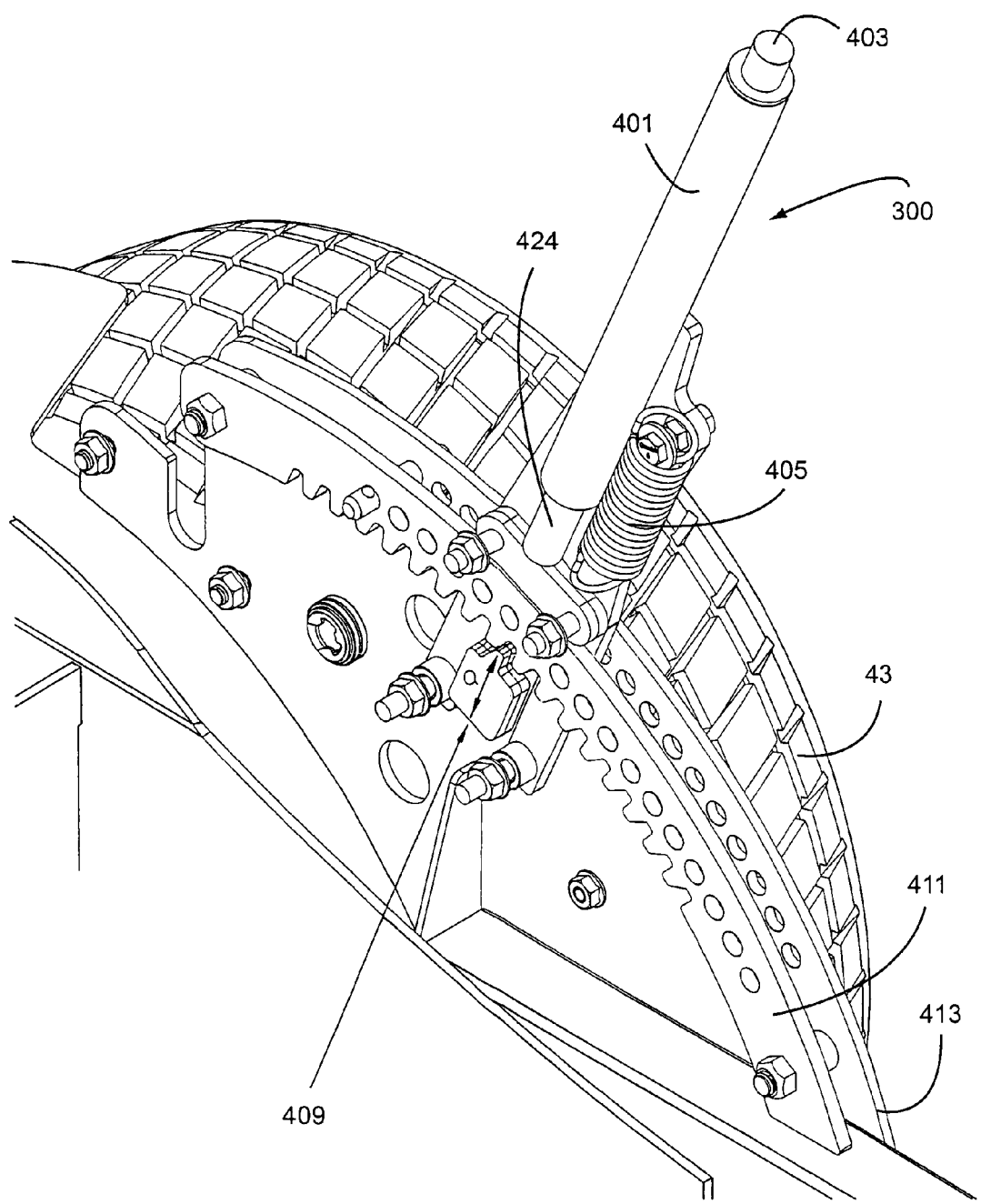
FIG. 9 is a perspective view of a lever/latch system for use in connection with the lift handle assembly of the deck lift system according to an example embodiment of this invention, in connection with the mower of FIGS. 5-8 for example.

FIGS. 6-8 illustrate a deck lift system according to an example embodiment of this invention. The deck lift system shown in FIGS. 6-8 is used to selectively raise and lower the integrated structure 200 (together with the combustion engine and pumps) shown in FIG. 5. As mentioned above, the integrated structure 200 is raised/lowered relative to the frame of the mower (i.e., the mower's frame does not move up/down with the integrated structure 200). It is noted that certain components are not shown in FIGS. 6-8 for purposes of drawing simplicity (e.g., the engine deck, weldments 14, pumps, and handle control assembly are not shown in FIG. 6; and only part of the port side of the mower is shown in FIG. 8).

Referring to FIGS. 5-8, the deck lift system includes lift handle assembly 300, port side rear deck lift support bracket or weldment 302 (this may also be referred to as a rear lift torsion member), starboard side rear deck lift support bracket 304 (this may also be referred to as a rear lift torsion member), rear bar 306 extending across a substantial width of the mower and for rigidly connecting brackets 302 and 304 to one another so that brackets 302, 304 and bar 306 all move together in unison during use of the deck lift system, elongated deck lift link 308 extending in a forward/aft direction of the mower, port side front deck lift support bracket or weldment 310, starboard side front deck lift support bracket 312, front bar 314 extending across a substantial width of a front portion of the mower and for rigidly connecting brackets 310 and 312 to one another so that brackets 310, 312 and front bar 314 all move together in unison during use of the deck lift system, mower frame 316 (including and rigidly connected to the tractor frame), port side cutter deck hanger bracket or link 318 for pivotal attachment to the cutter deck assembly at 319, starboard side cutter deck hanger bracket or link 320 for pivotal attachment to the cutter deck assembly at 321, port side static pivot axis 322 where the port side rear deck lift support bracket 302 is pivotally attached to and pivots with respect to the mower's frame 316, starboard side static pivot axis 324 where the starboard side rear deck lift support bracket 304 is pivotally attached to and pivots with respect to the mower's frame 316, port side floating pivot axis 326 where the port side rear deck lift support bracket 302 is pivotally attached to and pivots with respect to the engine deck 31, starboard side floating pivot axis 328 where the starboard side rear deck lift support bracket 304 is pivotally attached to and pivots with respect to the engine deck 31, port side static pivot axis 330 where the port side front deck lift support bracket 310 is pivotally attached to and pivots with respect to the mower's frame 316, starboard side static pivot axis 332 where the starboard side front deck lift support bracket 312 is pivotally attached to and pivots with respect to the mower's frame 316, port side floating pivot axis 319 where the port side cutter deck hanger bracket 318 is pivotally attached to and pivots with respect to the cutter deck assembly 12, starboard side floating pivot axis 321 where the starboard side cutter deck hanger bracket 320 is pivotally attached to and pivots with respect to the cutter deck assembly 12, coaxial pivot axes 334 where the hanger brackets 318, 320 are pivotally connected to and pivot with respect to respective brackets 310, 312, and attachment points 360 where the engine deck 31 is bolted to the cutter deck assembly 12 and pivots on the rear deck lift weldment 302, 304, 306. Elements 302, 304 and 306 all move together, and may be welded to each other to ensure unitary movement of this group of elements in certain example embodiments of this invention. Likewise, elements 310, 312 and 314 all move together, and may be welded to each other to ensure unitary movement of this group of elements in certain example embodiments of this invention. It is noted that components 310, 314 and 318 are optional in certain example embodiments of this invention.

Pivot axes 330 and 332 are coaxial or substantially coaxial in certain example embodiments of this invention; pivot axes 322 and 324 are coaxial or substantially coaxial in certain example embodiments of this invention; pivot axes 326 and 328 are coaxial or substantially coaxial in certain example embodiments of this invention; and pivot axes 319 and 321 are coaxial or substantially coaxial in certain example embodiments of this invention.

An example operation of the deck lift system of FIGS. 5-8 will now be described. When an operator or user pulls back/up on the handle of the lift handle assembly 300, this causes the integrated structure 200 of FIG. 5 to be raised relative to the mower's frame 316 thereby causing the mower's cutting height to be heightened. Direction "a" shown in FIG. 7 illustrates directions that the lift handle assembly can be moved. Pulling up/back on the handle of handle assembly 300 causes port side rear deck lift bracket 302 to rotate or pivot counterclockwise (as viewed in FIGS. 6-7) relative to the mower's frame 316 about pivot axis 322. Since brackets 302, 304 and bar 306 are an integrated structure (e.g., welded together) and move together, this also causes bracket 304 and bar 306 to rotate or pivot counterclockwise relative to the frame 316 about pivot axis 324, 322. This rotation of 302, 304, 306 about axis/axes 322, 324 causes elongated deck lift link 308 to move in at least direction "b" toward the rear of the mower (i.e., to the left in FIGS. 6-7). This substantially linear (and slightly vertical) movement of link 308 toward the rear of the mower in direction "b" causes front deck lift support bracket 312 to rotate or pivot counterclockwise about pivot axis 332 relative to the mower's frame 316. Since brackets 310, 312 and bar 314 are an integrated structure (e.g., welded together) and move together, this also causes bracket 310 and bar 314 to rotate or pivot counterclockwise relative to the frame 316 about pivot axis 332 (note that bracket 312 is pivotally connected to non-threaded link 308 at pivot point or axis 340). This counterclockwise rotation or pivoting of brackets 310 and 312 about pivot axis 332 causes hanger brackets 318 and 320 to move at least vertically upward relative to the frame 316 (see direction "c" in FIG. 7). Since hanger brackets 318 and 320 are attached at bottom portions thereof to the cutter deck assembly 12, this upward movement of hanger brackets 318, 320 causes the cutter deck assembly 12 (and the rest of integrated structure 200 shown in FIG. 5) to be raised relative to both the ground and frame 316. In such a manner, the integrated structure 200 shown in FIG. 5 can be lifted upwardly in order to raise the cutting height of the mower. When an operator or user causes the handle of the lift handle assembly 300 to move in the other direction (move downwardly or rotate clockwise as viewed in FIGS. 6-7), the opposite occurs and this cause the integrated structure 200 of FIG. 5 to be lowered relative to the mower's frame 316 thereby causing the mower's cutting height to be lowered.

Pivot action of the deck lift system shown in FIGS. 5-8 provides the ability to move the engine deck 31, cutter deck assembly 12, engine, hydro pumps, and handle assembly 32-34 up/down together at the same time. In this respect, the cutter deck assembly 12 and engine deck 31 are welded, bolted or otherwise rigidly connected to each other so as to move together. Cutter and engine decks adjust together in relation to the frame in a rigid manner that causes there to be no, or substantially no, movement between the frame 316 and the engine deck 31 other than a controlled arc. This allows there to be narrower spaces and gaps between the frame 316 and the cutter/engine deck(s). This is particularly advantageous in situation where small mower are desired and it is desired to fit many parts into a narrow profile or space. The integrated structure shown in FIG. 5, combined with the discussed deck lift system, allows one to overcome design hurdles of trying to fit pumps, an engine, etc. in a small area between the rear drive-wheels or tires. Moreover, this deck lift system may, in certain example embodiments, avoid the need for chains to support the cutter deck; this is advantageous in that the problem of cutter deck dangling around during use and possibly jumping upwardly during use is not an issue. Thus, it is more efficient to fit more mower components into a smaller area. While the deck lift system discussed above is illustrated in conjunction with a mower than can support a sitting and/or standing operator, this deck lift system can of course be used in other types of mowers as well in different embodiments of this invention.

As mentioned above in connection with FIGS. 5-8, the cutter and engine decks adjust together in relation to the frame in a rigid manner that causes there to be no, or substantially no, movement between the frame 316 and the engine deck 31 other than a controlled arc. Thus, there is one degree of freedom. The arc is between the frame 316 and the engine deck 31 for example, with an arc axis is defined at pivot 322, 324 and at pivot 332. The one degree of freedom makes it easier and more efficient to realize and maintain close tolerances, since the cutter deck assembly is moving in one path so that one knows where it will go during mower operation (no dangling of the cutter deck from chains). The control lock linkage moves also in an arc that is parallel to the arc discussed above (this linkage is part of the break and pump lock out system). Thus, this represents an example of how multiple components can be designed so as to move about a common arc thereby making more efficient use of space. It is noted that the decks of the mower in this embodiment are not floating decks (this is not a floating deck system) because the decks cannot float/move upwardly during operation; however, cut height is adjustable as explained above.

FIG. 8 illustrates a spring-assist feature of the deck lift system according to an example embodiment of this invention. Extension spring 350 resists extension in direction "b." The extension spring 350 is connected between the mower's frame 316 and the integrated structure 200 that moves up/down together when the deck lift system is actuated. A reason why this spring is used is to cause the force of the spring to travel directly from the frame to the integrated structure 200 rather than through a system of linkages which in turn would introduce friction to the lift system. In FIG. 8, the top end of the spring 350 is connected to the mower's frame 316, whereas the bottom end of the spring 350 is connected to the cutter deck assembly 12 and thus to the integrated structure 200. Because the spring 350 is connected between the frame 316 and the integrated structure 200, the spring 350 assists in lifting the integrated structure 200 (including the engine, engine deck and cutter deck) when the lift handle assembly 300 is raised/pulled. In the past, horizontal compression springs have been used. However, according to the FIG. 8 embodiment of this invention, the spring 350 is much different in that spring 350 (a) is an extension spring that resists extension, and (b) is not horizontally oriented. The vertical or substantially vertical orientation of spring 350 helps to more efficiently pull the integrated structure 200 and thus the decks upwardly and thus helps when trying to raise deck in direction "c" with the deck lift system. In certain example embodiments of this invention, the elongated axis of spring 350 (see direction "b" in FIG. 8) defines an angle of from about 0-45 degrees with the vertical, more preferably from about 0-30 degrees with the vertical, and most preferably from about 0-20 degrees with the vertical. There may be one such spring 350 on each side of the mower in certain example embodiments, although only one side of the mower (and thus only one spring) is shown in FIG. 8 for purposes of simplicity.

Figure 10:
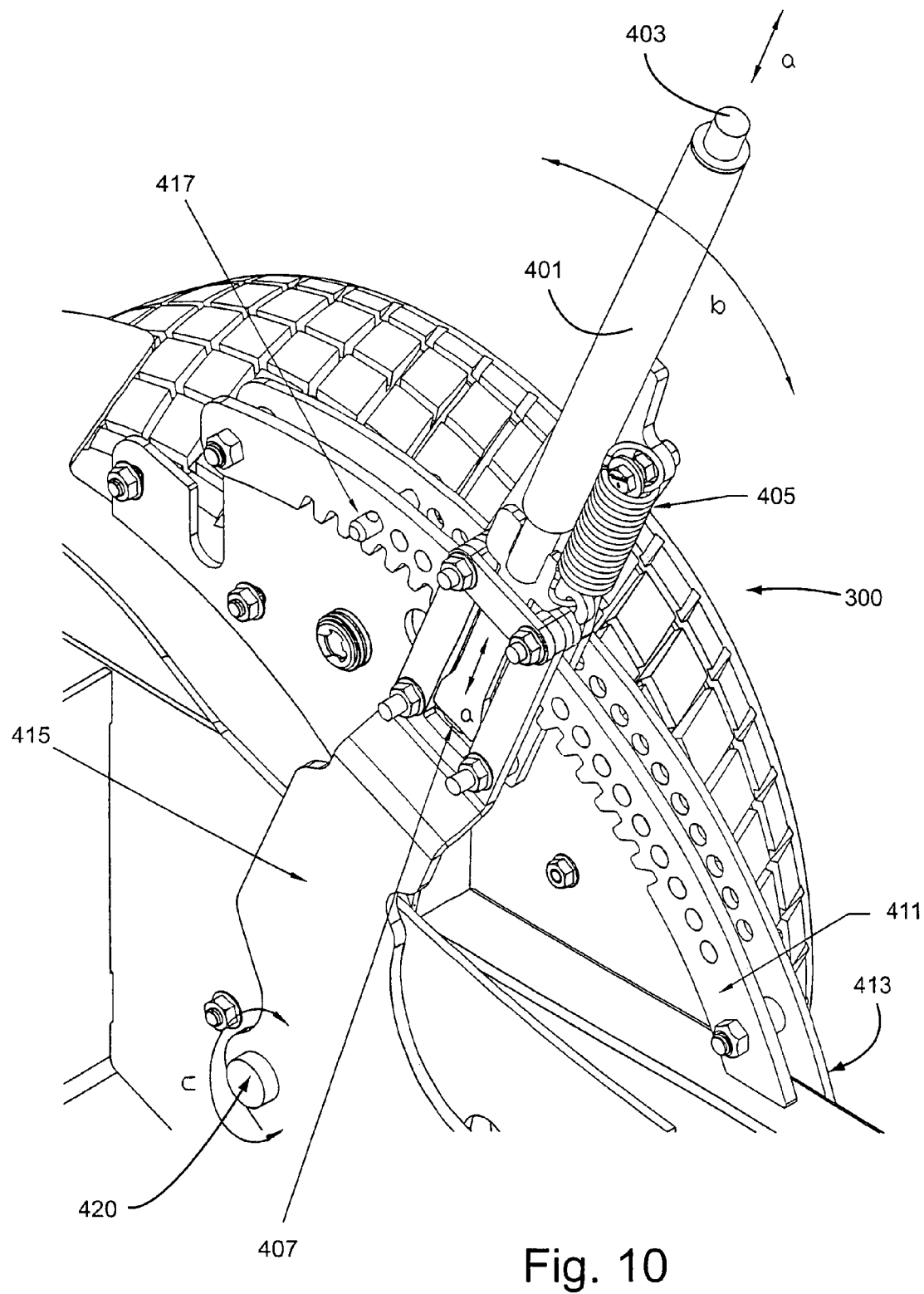
FIG. 10 is a perspective view of a lever/latch system for use in connection with the lift handle assembly of the deck lift system according to an example embodiment of this invention, in connection with the mower of FIGS. 5-8 for example.

FIGS. 9-12 are perspective views of a lever/latch system for use in connection with the lift handle assembly 300 of the deck lift system according to an example embodiment of this invention. This system permits more efficient movement and locking of the handle assembly of the deck lift system. The lift handle assembly includes lift handle 401, button 403 which when pressed permits the handle to be moved, deck lock extension spring 405, deck height locking plate 407, deck lock 409, deck lift cog 411, fender plate 413, left rear deck lift arm 415, and ball locking pin 417. Note that locking plate 407 is not shown in FIG. 9, for purposes of simplicity so as to show lock 409. Direction "a" in FIG. 10 depicts the movement direction of the welded assembly of the deck lift button 403, deck height lock plate 407, and deck lock 409 to engage/disengage the deck lock 409 from the teeth or tooth of arc-shaped deck lift cog 411. Direction "b" in FIG. 10 depicts movement direction of the deck lift handle 401, incrementally adjusting the integrated structure 200 (including the decks and engine) up/down. Direction "c" in FIG. 10 depicts the rotation direction of the handle 401 and deck lift arm 415 about pivot axis 420 as the deck lift assembly is used to adjust the decks upwardly/downwardly so as to change the cutting height of the mower.

Figure 11:
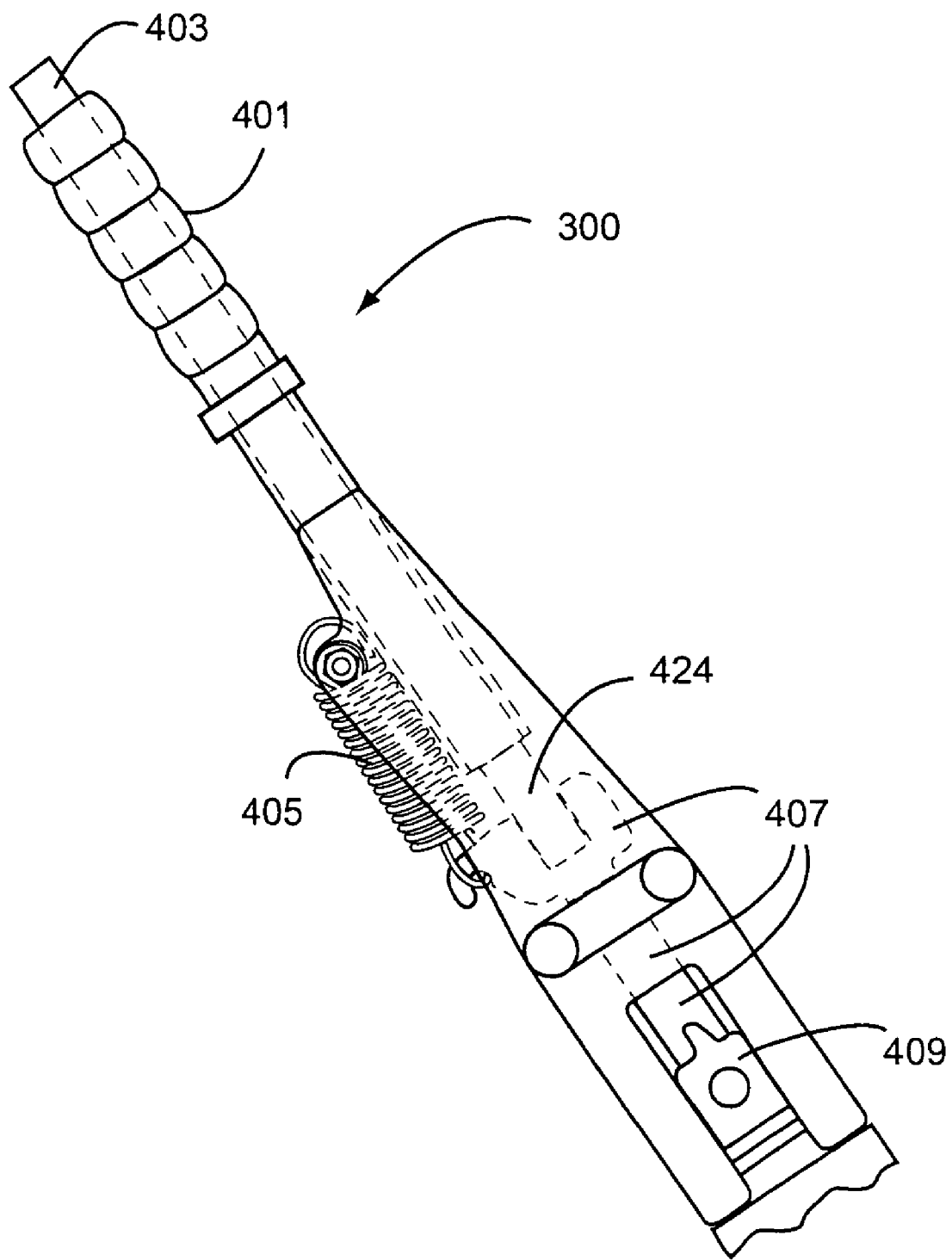
FIG. 11 is a partially transparent side view of the lever/latch system of FIGS. 9-10, taken from a view on the tire side of the system (from the opposite side viewed in FIGS. 9-10).
Figure 12:
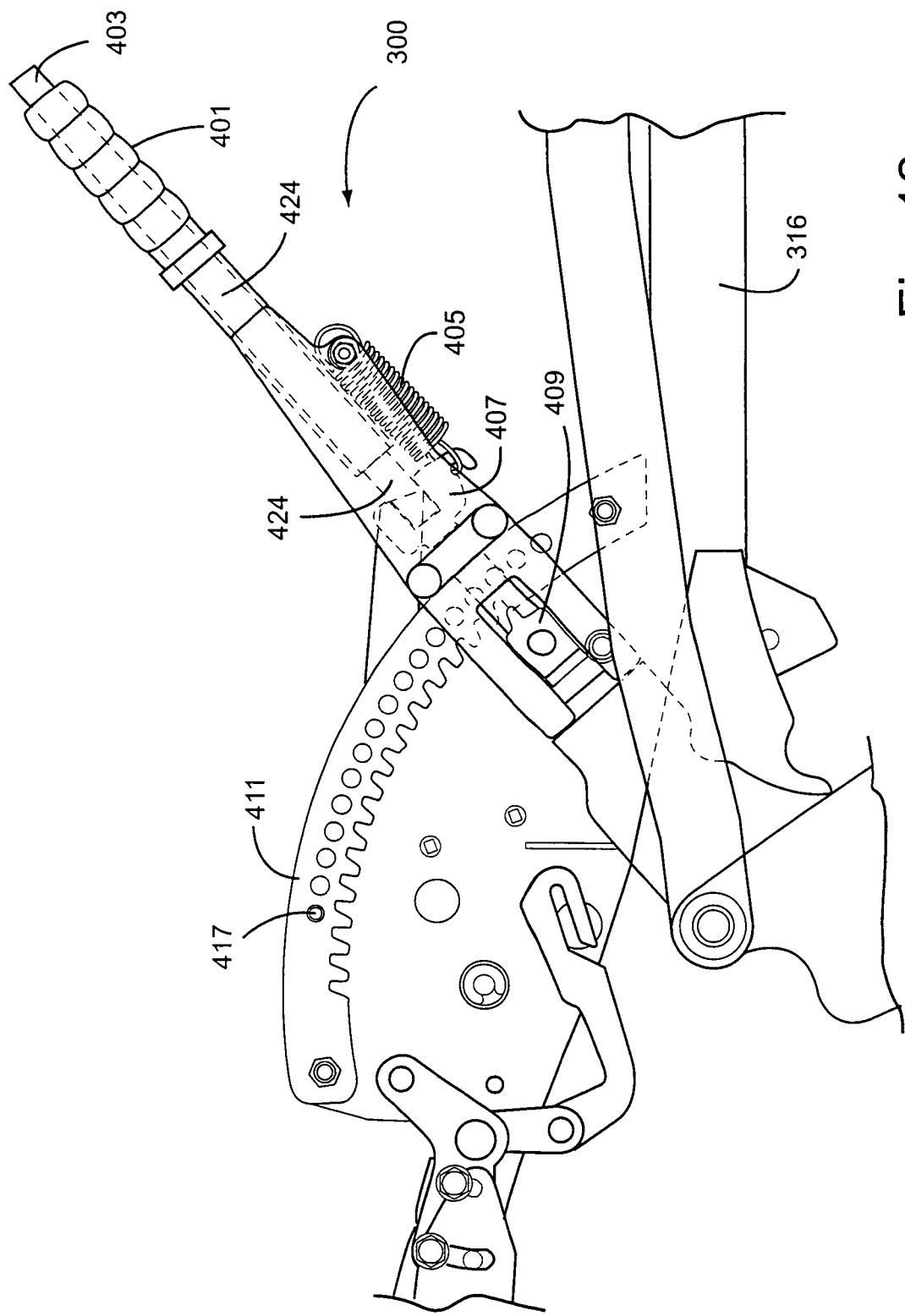
FIG. 12 is a partially transparent side view of the lever/latch system of FIGS. 9-11.

Referring to FIGS. 9-12, push button 403 is either integrally formed with or rigidly connected to bar 424. Thus, when a user presses button 403, bar 424 also moves downward toward lock 409 and the ground. Button 403 and/or bar 424 are at least partially provided within a hollow defined in handle grip 401. The bottom end portion of bar 424 engages and fits within a channel or recess defined in a top portion of deck height lock plate 407 as best shown in FIGS. 11 and 12. Thus, when button 403 is pressed downwardly, this causes bar 424 and lock plate 407 to also move downwardly toward the ground. Since lock plate 407 is connected to deck lock 409, lock 409 moves together with plate 407, so that when the button 403 is pressed downwardly the lock 409 disengages from the tooth or teeth defined in the inner arcuate surface of cog 411 as shown in FIG. 12 for example. Spring 405 is connected between the handle or handle grip portion 401 and the lock plate 407, and thus biases these two elements toward one another. Once the lock 409 has been disengaged from the teeth of the cog, the handle may be moved in direction "b" in order to adjust the height of the integrated structure 200 including the engine and cutter decks. When the operator has reached a desired height for the deck(s), the operator lets go of the button 403 and spring 405 biases the lock plate 407 and thus also the lock 409 upwardly so that the lock 409 again becomes engaged with teeth (or tooth) of the cog thereby locking the deck lift system in position and maintaining the desired height of the integrated structure 200. In alternative embodiments of this invention, the cog could be inverted so that the teeth thereof would face outwardly instead of inwardly.

Figure 13:
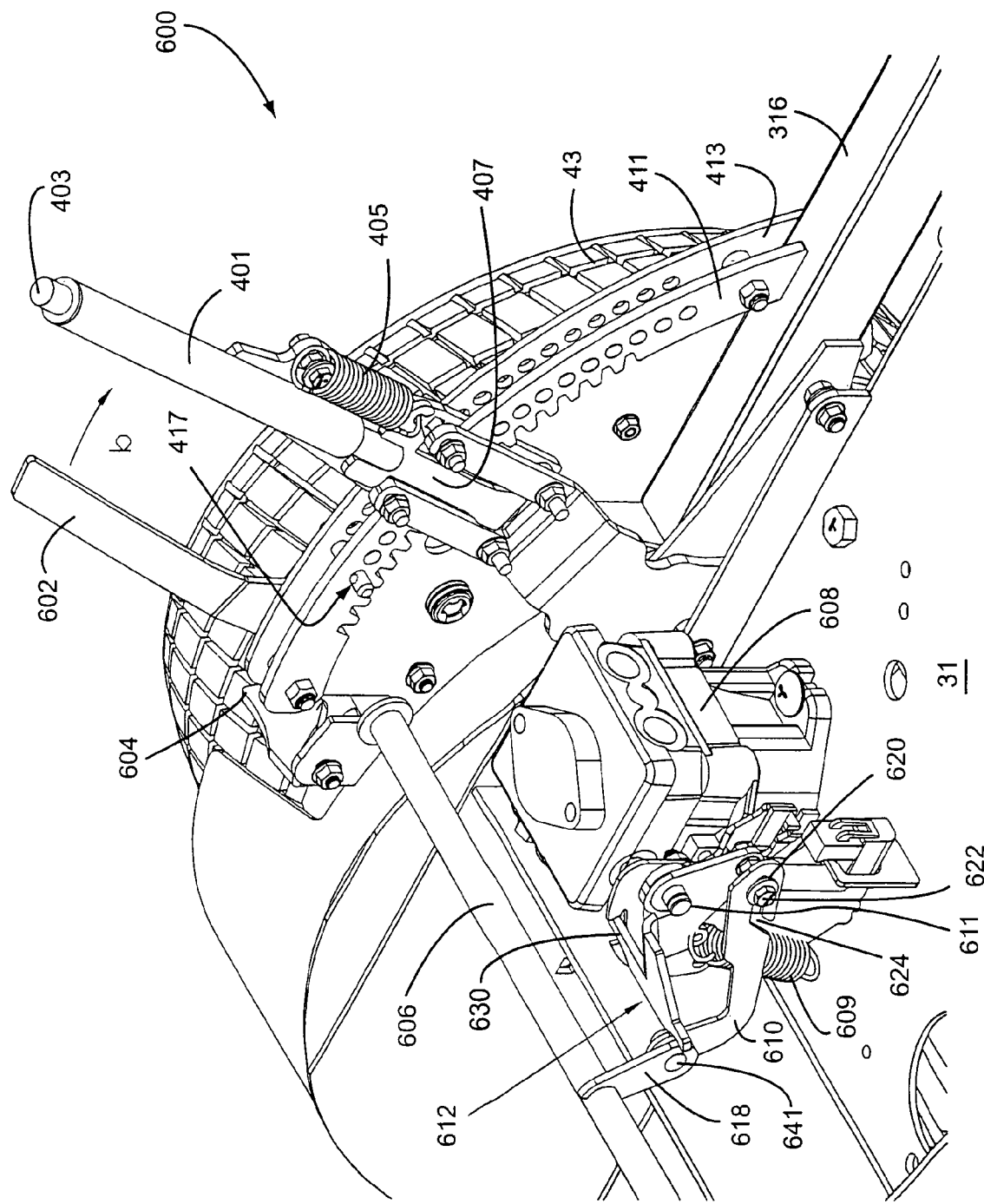
FIG. 13 is a perspective view of a parking brake and pump lock-out system according to an example embodiment of this invention, that may be used in conjunction with the mower of FIGS. 5-12.
Figure 14:
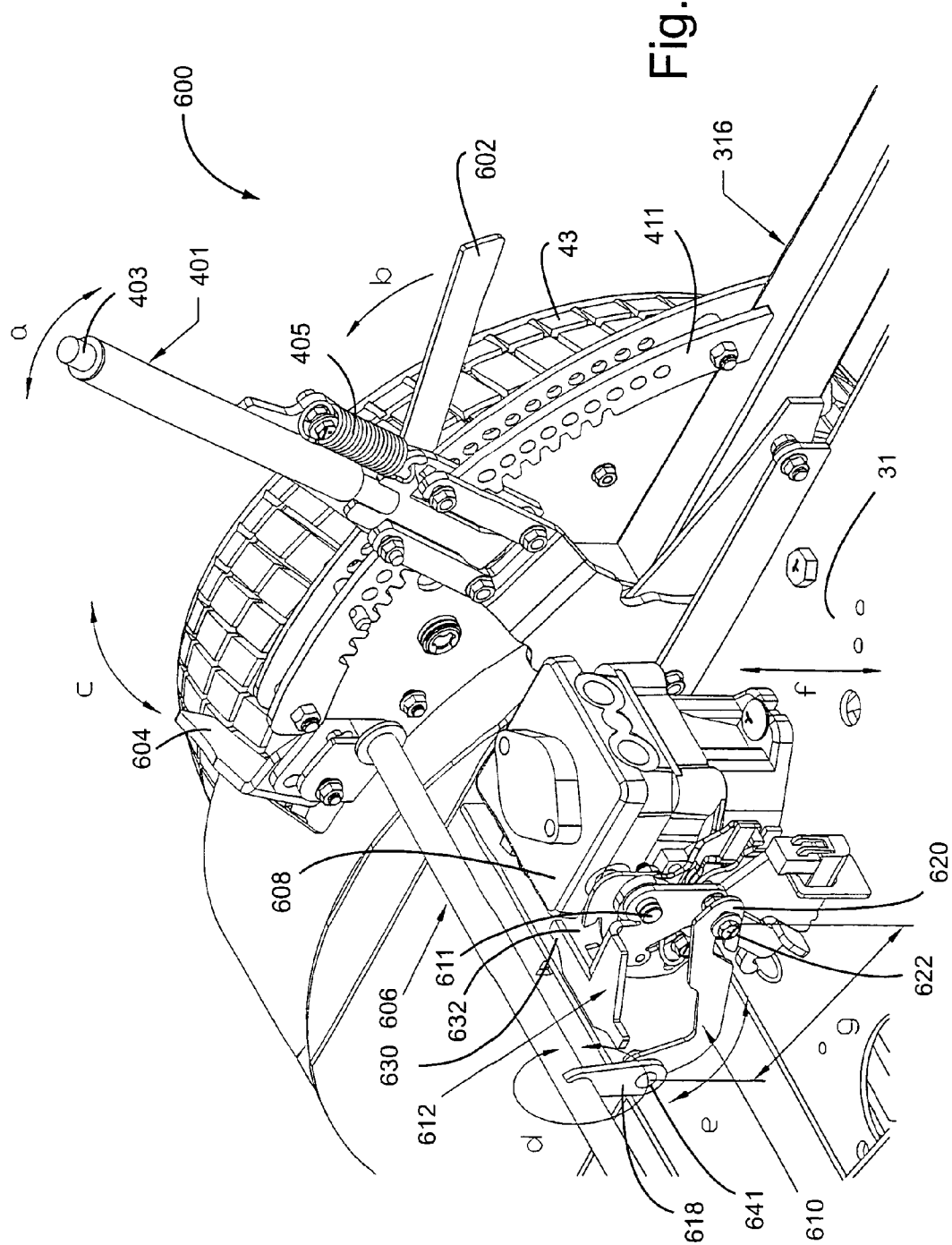
FIG. 14 is a perspective view of the parking brake and pump lock-out system of FIG. 13, in a different position.

FIGS. 13-14 illustrate a pump lock-out and brake system that may be used in conjunction with the mower discussed above in certain example embodiments of this invention. The pump lock-out system is typically used in conjunction with a zero turning radius mower such as that disclosed in the figures, where the mower includes first and second hydro pumps for controlling first and second corresponding wheel motors, so that the first and second rear drive wheels 43 may be driven independently in order to conduct zero radius turns. Thus, each rear drive wheel 43 of the mower is controlled by a corresponding wheel motor and a corresponding hydraulic (or hydro) pump, so that the pump and motor can control the speed and direction of the wheel's rotation. Each drive wheel can thus be driven in both forward and reverse directions as explained in any of U.S. Pat. Nos. 6,912,831, 6,138,446, 6,390,225, 6,688,089, 6,438,931, 6,189,304, 6,438,930, 6,658,831, 6,560,952, and 5,964,082, the disclosures of all of which are all incorporated herein by reference. The mower of FIGS. 13-14 has pumps and wheel motors, and rear drive wheels, as explained in any of these patents which are incorporated herein by reference. In the pump lock-out and brake system of FIGS. 13-14, a hand-actuated lever 602 actuates both a pump lock-out system and causes a braking force to be applied to at least one of the rear drive wheels 43 of the mower (e.g., via one or more brake shoes 604). Thus, actuation (e.g., pulling) of the lever 602 by an operator causes both (a) braking force to be applied to at least one wheel of the mower via a brake shoe, band, or the like, and (b) the pump lock-out system to be engaged so as to prevent at least one pump from being changed from a neutral state. In certain example embodiments, the lever 602 may be a parking brake lever or any other type of lever. In certain example embodiments, actuation of the lever causes the pump lock-out system to be engaged with respect to both of the pumps (i.e., for the pumps for both rear drive wheels 43) so as to prevent both of the pumps from being changed from the neutral state.

Referring to FIGS. 13-14, the pump lock-out and braking system includes hand-actuated pump lock-out and brake lever 602, brake shoe 604 for applying braking force to rear drive wheel 43 (there may be two such brake shoes 604, one for each rear drive wheel 43 in certain example embodiments), brake and pump lock-out bar 606, hydraulic pump 608 for controlling the direction and speed of drive wheel 43, actuator bracket 610 for locking the pump 608 in a neutral state (as opposed to a forward or reverse wheel direction state), control lock-out member 612 (shown in FIG. 14 in a free or unlocked position, and in FIG. 13 in an engaged or locked position), and spring 609 that biases the side of control lock-out member 612 rearward of pivot downwardly. Reference "b" in FIG. 14 depicts movement direction of the pump lock-out and brake lever 602 and weldment thereof, reference "c" in FIG. 14 depicts movement direction of the brake shoes 604 into and out of engagement with the drive wheel 43, reference "d" in FIG. 14 depicts the rotation direction of pump lock-out bar 606, reference "e" in FIG. 14 depicts movement direction of the lock-out actuator bracket 610, reference "f" in FIG. 14 depicts the vertical movement direction of the pump 608, engine deck 31 and other components of the integrated structure 200 relative to the mower's frame during operation of the deck lift system, and reference "g" in FIG. 14 depicts a dimension between pivot points of the control lock-out actuator bracket 610 with this geometry allowing for this dimension to remain constant or substantially constant as the engine deck 31 moves up/down relative to the mower's frame 316.

Note that FIG. 13 illustrates the brake shoe 604 in the engaged or locked position. FIG. 13 illustrates the hand-actuated pump lock-out and brake lever 602 in the brake set and pump lock-out position (i.e., the brake shoe is engaged, and the pump 608 is locked in a neutral state).

Lever 602 and bar 606 are connected by way of an over-center link thus causing lever 602 and bar 606 to rotate approximately proportionally to each other even though they are not welded to each other. Thus, when an operator pulls lever 602 upwardly from the FIG. 14 position to the FIG. 13 position of the lever 602, this causes the bar 606 to rotate in a counterclockwise direction as viewed in FIGS. 13-14. This counterclockwise rotation of bar 606 and lever 602 causes the brake shoe 604 to engage with an exterior surface of the tire of the illustrated rear drive wheel 43, and also causes member 618 welded to the bar 606 to rotate in a counterclockwise direction about an axis defined by the lengthwise axis of bar 606. Since lock-out actuator bracket 610 is pivotally connected to member 618, the counterclockwise rotation or pivoting of member 618 causes the end 620 of bracket 610 to move further forward or toward the front of the mower which in turn allows the pin 622 of control lock-out member 612 in slot 624 to move further forward as spring 609 pulls downwardly on the rear portion of lock-out member 612 behind pivot 611. This allows the spring 609 to pull the engaging portion 630 of the lock out member 612 downwardly into engagement with the notch 632 in the pump lever thereby locking the pump lever in the neutral position as shown in FIG. 13, since the member 612 pivots about axis 611.

Thus, in connection with the pump lock-out and braking system of FIGS. 13-14, parking brake actuation and pump lock-out can be performed without moving the engine deck or cutter deck assembly. The brake and the pump lock out are connected through a rigid link 606 instead of via a cable. The brake system including shoe 604, lever 602 and bar 606 stay with the mower's frame, and do not cause movement of the cutter or engine deck. The frame and deck assembly are moved in a controlled path relative to each other, so one can provide a rigid pump lock link 610 between them. The rigid pump lock link 610 generally moves parallel with the rear torsion member 302, 304, and the center distance or link length between axes 322 (or 324) and 326 (or 328) is the same or substantially the same as the distance "g" between pivot axes 641 and 622 of pump lock link 610, so that the pump lock is substantially stationary relative to the deck assembly regardless of the deck height even when the decks move up/down. Link 610 has first and second pivot axes the first being defined in a round through-hole defined in the link 610 and the second being a slot 624 defined in the link as shown in FIG. 13. Link 610, when the brake is engaged, permits 630 to go into the lock-out slot shown in FIG. 13. Because link 610 is slotted on one end at 624, 612 is moved into the slot via tension from spring 609. In certain example embodiments of this invention, the distance between axes 322 (or 324) and 326 (or 328) differs from the distance "g" between pivot axes 641 and 622 of pump lock link 610 by no more than about 20% (more preferably by no more than about 10%, even more preferably by no more than about 5%, and most preferably by no more than about 2%) of the length of distance "g" between axes 641 and 622. This is advantageous because it avoids necessity for cables and makes the overall system much simpler and more efficient. It will be recognized that at least components 608, 609, 611, 612, 622, 630, 632, 31, 12, 14, 204, 202, 210, 32-34, 36 and 200 move up/down along with the engine deck, engine, mower deck and structure 200 when the lift system is used, whereas at least components 602, 604, 606, 618, 316, and 411 are attached to the frame of the mower and do not move up/down along with the engine deck, mower deck and structure 200. By causing the respective pivot axes of each link (e.g., see links 610, 302 and 304) between the frame components and the movable deck components to be spaced apart by the same distance or approximately the same distance, the frame and deck assembly are moved in a controlled path relative to each other so that one can provide a rigid pump lock link(s) between them and avoid the need for cables for communication between them (e.g., can avoid the use of cables in the pump lock-out system and/or other systems).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A lawn mower comprising:
   at least one cutting blade for cutting grass;
   first and second drive wheels;
   a cutter deck assembly and an engine deck, the engine deck supporting an engine that drives the at least one blade for cutting grass;
   a handle control assembly for allowing an operator to steer the mower by controlling the speed and direction of the first and second drive wheels;
   a deck lift system for raising together each of the cutter deck assembly, engine deck, and engine relative to a frame of the mower in changing a cutting height of the mower, wherein the deck lift system does not use chains to support the cutter deck assembly;
   wherein the cutter deck assembly and engine deck are arranged so as to move together in relation to the frame in a rigid manner that causes there to be substantially no movement between the frame and the engine deck other than a controlled arc, resulting in one degree of freedom; and
   an extension spring that resists extension, the extension spring having an axis that defines an angle of from about 0 to about 45 degrees with the vertical, and wherein the extension spring provides force to help lift the cutter deck assembly and engine deck when the deck lift system is used to raise the cutter deck assembly and engine deck.

2. The mower of claim 1, wherein the spring is connected between, directly or indirectly, the frame of the mower and the cutter deck assembly.

3. The mower of claim 1, wherein the axis of the spring defines an angle of from about 0 to 20 degrees with the vertical.

* * * * *